3,095,270
METHOD OF SEPARATING SILICA FROM ZIRCONIUM SULPHATE SOLUTIONS
Malcolm Korach and James K. Thomas III, Corpus Christi, Tex.; said Korach assignor, by mesne assignments, to Pittsburgh Plate Glass Company; and said Thomas assignor to Columbia-National Corporation, Escambia County, Fla., a corporation of Massachusetts
No Drawing. Filed Feb. 26, 1959, Ser. No. 795,597
8 Claims. (Cl. 23—117)

This invention relates to a novel method of removing silica from zirconium or hafnium. Silica conventionally occurs in nature with zirconium and hafnium. One of the more widely known zirconium ores is zircon which predominantly has the composition $ZrO_2.SiO_2$ and also contains the compound $HfO_2.SiO_2$. This material contains approximately one mole of $SiO_2$ per mole of $ZrO_2$ because of the relatively small amount of hafnium therein. The ore also may be contaminated with additional silica existing as ordinary silica sand and may also contain small amounts of other impurities, such as titanium, iron or other like heavy metal oxides.

In accordance with the invention herein contemplated, the silica is separated from the zirconium and/or hafnium by forming a fluid aqueous solution containing the zirconium or hafnium together with some portion of the silica present as an impurity and in which the weight ratio of $SO_4$ to Zr and/or Hf is not less than 2.5, the free sulphuric acid concentration being not over 45 percent and the amount of sulphuric acid solution (or the amount of water therein) being sufficient to dissolve the zirconium and to form a fluid solution thereof which usually contains suspended or undissolved matter. This solution is then heated at a temperature of at least 125° F., rarely in excess of the boiling point of the solution at atmospheric pressure, until the silica has precipitated. Thereafter, the silica is separated by filtration, including centrifugation, and the purified sulphuric acid solution containing dissolved zirconium therein is recovered.

Frequently, it is desirable to prepare zirconium hydroxide or hydrate which has a low silica concentration. In such a case, the purified zirconium-sulphate solution is reacted with a suitable alkali, such as ammonia, ammonium carbonate or the like, in order to precipitate the zirconium hydroxide. This zirconium hydroxide can then be washed to remove a major portion of the sulphate and other impurities contained therein, and recovered.

The process herein contemplated is especially adapted to the recovery of zirconium from zircon and like silica-zirconium ores. In such a case, the zirconium-silica ore, such as zircon, is heated with an alkali metal hydroxide or an alkali metal carbonate at an elevated temperature sufficiently high to break the bond between the zirconium oxide and the silicon dioxide and to form sodium silicate. Thereafter, the resulting product is extracted with water to remove sodium silicate. The resulting product, which contains all of the zirconium and a portion of the silica, rarely in excess of about 30 percent thereof, is dissolved in sulphuric acid to produce a solution of the type described above, and the solution is heated to precipitate the silica as explained above.

It is important that the free sulphuric acid concentration in the aqueous solution thus formed be at least 10 percent but not more than 45 percent by weight. Free sulphuric acid, as herein defined, is measured by determining the weight of unreacted sulphuric acid and the weight of water in the solution and computing the free sulphuric acid concentration according to the following equation:

Free sulphuric acid concentration
$$= \frac{100 \text{ times the weight of unreacted sulphuric acid in the solution}}{\text{weight of water} + \text{weight of unreacted sulphuric acid in the solution}}$$

A convenient way to compute the unreacted sulphuric acid is to titrate the alkalinity (not due to zirconium) in the zirconium compound or hydroxide to be dissolved, measure the amount of zirconium therein, and then to dissolve the zirconium hydrate or like compound to be subjected to treatment in the amount of acid computed to supply enough acid to neutralize the alkalinity, dissolve the zirconium, and supply the required excess or free sulphuric acid. The unreacted sulphuric acid will then be the total amount of acid added to the solution minus the amount of acid equivalent to the alkalinity minus the amount of acid equivalent to the zirconium computed as zirconyl sulphate.

It is important that the free sulphuric acid should not exceed about 45 percent by weight since, when solutions containing higher concentrations of free $H_2SO_4$ are used, at least a portion of the zirconium may tend to precipitate out with the silica during the heating. The concentration of free sulphuric acid should be at least 10 percent by weight in order to ensure a relatively rapid elimination of silica.

It is also important that the weight ratio of $SO_4$ to Zr in the solution should not be less than 2.5. For most purposes, this ratio is in excess of 3, the optimum being about 4.5. The ratio rarely exceeds 7.5. Higher ratios may be used but no advantages accrue and raw material costs are increased.

The amount of sulphuric acid required to obtain the desired ratio may be computed as follows:

Weight of $H_2SO_4$
= desired ratio times 1.02 times weight of Zr

In order to achieve satisfactory precipitation of silica, the solution must be held at a temperature above about 125° F. Lower temperatures do not appear to have much effect on the silica concentration. The temperature rarely exceeds the boiling point of the solution at atmospheric pressure although higher temperatures may be used. Temperatures in the range of 175 to 225° F. normally are adequate.

The solution should be subjected to such heating long enough to cause precipitation of silica to the extent desired. Usually, this can be accomplished within a period of about 5 hours or less. Heating for periods of time in the range of 50 to 100 minutes normally is sufficient.

The heating should not be continued so long that zirconium can precipitate to any appreciable degree. As a usual thing, the zirconium tends to precipitate more readily at the higher acid concentrations than at the lower concentrations of $H_2SO_4$. Thus, a solution having a free $H_2SO_4$ concentration of 10 to 15 percent by weight may be heated for a period much longer without precipitation of zirconium than can a solution having a free $H_2SO_4$ concentration of 45 percent by weight.

The time of heating required may be shortened by heating the solution above its boiling point and under superatmospheric pressure. Thus, precipitation of silica to the desired extent from the solution by heating it at 300 to 600° F. can be achieved even with relatively short periods (for example, 5–20 minutes) of heating in this temperature range.

Following precipitation of the silica, the resulting slurry or milky solution is filtered through a filter capable of separating colloidal silica from the solution or is centrifuged or otherwise treated to remove precipitated silica. The resulting solution of zirconium contains only minor concentrations, rarely in excess of about 0.5 pound, of $SiO_2$ per 100 pounds of zirconium. It is useful for the production of other zirconium compounds where essential freedom from silica is desirable.

For example, the production of zirconium nitrate-hafnium nitrate compositions from materials containing these elements in order to effect a convenient separation of the hafnium from the zirconium by solvent extraction often is desirable. Thus, it is known that zirconium may be separated from hafnium by forming an aqueous nitric acid solution containing both zirconium and hafnium, and extracting this solution with an alkyl phosphate, such as tributyl phosphate. In this case, the tributyl phosphate extracts the zirconium from the solution, leaving the hafnium and numerous other metallic impurities in aqueous medium. Thereafter, the zirconium may be recovered from the tributyl phosphate by extraction of the tributyl phosphate-zirconium complex with water. This regenerates the tributyl phosphate which may be recycled for further extraction of zirconium nitrate-hafnium nitrate solution.

The presence of large amounts of silica in the extraction of zirconium-hafnium solutions with tributyl phosphate or like organic solvent is very undesirable. The silica tends to precipitate from the aqueous solution undergoing extraction and concentrates at the interface between the organic solvent and the aqueous solution. This concentration of silica can become so great that extraction of zirconium from the solution by the solvent becomes inefficient or even impossible. Consequently, the provision of nitrate solutions which have a low concentration of silica is highly desirable.

The present invention affords a very convenient method by which this can be accomplished. Thus, the zirconium-sulphate solution, prepared as described above and containing hafnium as a normal impurity, can (after removal of silica therefrom according to this invention) be treated with an alkaline agent, such as ammonia or other alkaline agent, in order to precipitate zirconium hydrate. This zirconium hydrate can be washed to remove a portion of the sulphate adsorbed thereon. Thereafter, it is dissolved in nitric acid to produce the hafnium-zirconium nitrate solution desired for the extraction.

In the practice of a typical embodiment of the process herein contemplated, zircon ore containing hafnium and zirconium is reacted with an alkali metal hydroxide, such as sodium hydroxide, usually in the proportion of about 0.8 to 2 pounds of the alkali metal hydroxide per pound of zirconium ore. This reaction normally is effected at temperatures in the range of about 500 to 700° C. The process is conducted substantially as described in copending application Serial No. 753,617, filed August 7, 1958; by James R. Russell; copending application of Charles J. Sindlinger and Carl C. Clayton, Jr., Serial No. 666,477, filed June 18, 1957, now Patent No. 2,962,346, dated November 29, 1960; and copending application of Charles J. Sindlinger and Carl C. Clayton, Jr., Serial No. 666,478, filed June 18, 1957, now Patent No. 2,962,347 dated November 29, 1960; the disclosures of all of these applications being incorporated herein by reference.

The reaction of the alkali metal hydroxide with the zircon ore is commonly effected in a kiln. The resulting product is then mixed with water, whereupon the major portion of the silica is extracted as sodium silicate, leaving the zirconium and hafnium hydrates and alkali metal zirconate, hafnate, silicozirconate or silicohafnate. The material is dissolved in sulphuric acid and processed to remove silica as described above.

The following is a typical example:

*Example 1*

The zircon sand used contained about 66 percent by weight of zirconium, calculated as $ZrO_2$, and 32 percent by weight of $SiO_2$. It also contained about 1.3 percent by weight of $HfO_2$. The zircon had a particle size below about 50 mesh. This sand was fired with sodium hydroxide in the externally fired, rotating tube kiln 26 feet long and having an internal diameter of 3 feet. The kiln was heated to a bed temperature of about 1050 to 1150° F. and the process was conducted as follows:

Dry zircon was fed to the kiln, at the entry end thereof, continuously at a rate of 6.5 pounds per minute. An aqueous solution containing about 50 percent by weight of NaOH was fed into the kiln through 8 sprays which were individually supplied by 8 tubes each ¼ inch in diameter from a common source of sodium hydroxide solution. The first spray was located at 5 feet from the feed end of the kiln and the other sprays were spaced two feet apart in a row downstream of the kiln from the first spray nozzle. These tubes were enclosed in a cooling tube 4 inches in diameter which thus provided a cooling jacket extending along the length of the kiln. The sprays delivered a downwardly directed flat spray extending longitudinally of the kiln, the angle of each spray being about 65 degrees, so that the sprays did not intersect. The sodium hydroxide was introduced into the sprays at a total rate of about 1.3 gallons per minute, each spray being supplied with approximately an equal amount of sodium hydroxide solution. The temperature of the sodium hydroxide solution was held below the boiling point thereof by means of water circulating through the cooling jacket at a rate of about 10 to 20 gallons per minute. A dam ring was provided in the kiln, near the exit end thereof, to ensure provision of a bed depth of about 2 to 5 inches of the reacting zircon so that the caustic was largely consumed before it reached the kiln wall.

The alkali metal zirconate produced was withdrawn from the exit end of the kiln at a temperature of about 500° F. This process was continued, with only minor interruptions, for several months. No serious agglomeration and no serious corrosion or embrittlement of the equipment took place. Approximately 90 percent by weight of the zircon introduced was converted to sodium zirconate.

The resulting frit was fed directly into a pool of water held at a temperature of about 150° F., the amount of water in the pool being maintained at not less than about ½ gallon per pound of frit, usually ranging from 0.75 to 2 pounds per gallon. The resulting slurry was filtered. The resulting filter cake was largely alkali metal zirconate, zirconyl hydroxide, and water, also containing about 8 pounds of $SiO_2$ per 100 pounds of Zr, and 25 to 40 pounds of $Na_2O$ per 100 pounds of Zr.

This filter cake was slurried in enough water to make a slurry containing about 1.4 to 1.5 pounds of zirconium per gallon, and 307 gallons of such slurry was placed in a tank. One hundred thirty-five gallons of 98 percent sulphuric acid was fed into the tank at a rate of 2½ gallons per minute until the temperature of the solution rose to 225° F. because of the heat evolved due to addition of the acid. This solution had a free $H_2SO_4$ concentration of about 30 percent by weight, and the weight ratio of $SO_4$ to dissolved Zr in the solution was 4.5. The resulting solution was held at a temperature of 225° F. for 50 minutes. Thereafter, it was pumped to a cooling tank where it was cooled to about 145 to 150° F. over a period of about 1 hour. Thus, the solution remained at a temperature of over 175° F. for approximately 100 minutes.

After cooling, the solution was diluted to produce a solution containing 0.3 pound of dissolved zirconium per gallon of solution, and the resulting solution was filtered through a filter precoated with diatomaceous earth. This filtration removed silica which had precipitated in the course of the heat treatment. The solution undergoing filtration was at about 130° F. The resulting filtrate contained less than 0.15 pound of $SiO_2$ per pound of dissolved zirconium.

The above example is typical of the manner by which the invention may be performed. It will be noted that advantage was taken of the heat evolved by addition of the acid; this heat being used to heat the solution to reaction temperatures. This avoids the necessity of heating the solution by external means. Such a result can be accomplished by adding concentrated sulphuric acid containing in excess of 50 percent by weight of acidic ($SO_4$) as sulphuric acid and holding the water content of the zirconium suspension low enough to permit the required increase in temperature.

Although the present invention has been described with reference to the specific details of certain embodiments, it is not intended that such details shall be regarded as limitations upon the scope of the invention except insofar as included in the accompanying claims.

What is claimed:

1. A method of separating silica from zirconium which comprises forming a zirconium-sulphate solution which contains silica as an impurity and in which the weight ratio of $SO_4$ to Zr is at least 2.5, the concentration of free $H_2SO_4$ being at least 10 percent by weight but not in excess of 45 percent by weight and the amount of water in said solution being sufficient to hold the zirconium in solution and to produce a fluid solution, heating the solution at a temperature of at least 125° F. until silica has precipitated, and separating the precipitate from the zirconium solution.

2. A method of separating zirconium from silica which comprises reacting zircon with an alkali whereby to convert silica in the zircon to alkali metal silicate, extracting alkali metal silicate with water, dissolving the residue in sulphuric acid to produce a zirconium-sulphate solution which contains free sulphuric acid and also contains silica as an impurity and in which the weight ratio of $SO_4$ to Zr is at least 2.5, the concentration of free $H_2SO_4$ being at least 10 percent but not in excess of 45 percent by weight and the amount of water in said solution being sufficient to hold the zirconium in solution and to produce a fluid solution, heating the solution at a temperature of at least 125° F. until silica has precipitated, and separating the precipitate from the zirconium solution.

3. A method of separating zirconium from silica which comprises reacting zircon with sodium hydroxide whereby to convert silica in the zircon to sodium silicate, extracting sodium silicate therein with water, dissolving the residue in sulphuric acid to produce a zirconium-sulphate solution which contains free sulphuric acid and also contains silica as an impurity and in which the weight ratio of $SO_4$ to Zr is at least 2.5, the concentration of free $H_2SO_4$ being at least 10 percent but not in excess of 45 percent by weight and the amount of water in said solution being sufficient to hold the zirconium in solution and to produce a fluid solution, heating the solution at a temperature of at least 125° F. until silica has precipitated, and separating the precipitate from the zirconium solution.

4. A method of separating zirconium from silica which comprises reacting zircon with an alkali whereby to convert silica in the zircon to alkali metal silicate, extracting alkali metal silicate with water, dispersing the residue in water to produce a slurry, adding enough sulphuric acid to produce a zirconium-sulphate solution which contains free sulphuric acid and also contains silica as an impurity and in which the weight ratio of $SO_4$ to Zr is at least 2.5, the concentration of free $H_2SO_4$ being at least 10 percent but not in excess of 45 percent by weight, while proportioning the amount of water in said slurry so that there is enough water to hold the zirconium in solution and to produce a fluid solution while maintaining the amount of said water low enough so that the temperature of the solution is raised above 125° F. by the heat evolved due to addition of the sulphuric acid, maintaining the temperature of the solution above 125° F. until silica has precipitated, and separating the precipitate from the zirconium solution.

5. The process of claim 4 wherein the alkali is sodium hydroxide and the alkali metal silicate is sodium silicate.

6. The process of claim 1 wherein the weight ratio of $SO_4$ to Zr is not in excess of 7.5.

7. The process of claim 2 wherein the weight ratio of $SO_4$ to Zr is up to 7.5.

8. A method of separating zirconium from silica which comprises forming a zirconium-sulphate solution which contains silica as an impurity and in which the weight ratio of $SO_4$ to Zr is about 4.5 to about 7.5, the concentration of free $H_2SO_4$ being at least 10 percent by weight but not in excess of 45 percent by weight and the amount of water in said solution being sufficient to hold the zirconium in solution and to produce a fluid solution, heating the solution at a temperature of at least 125° F. until silica has precipitated, and separating the precipitate from the zirconium solution.

References Cited in the file of this patent

UNITED STATES PATENTS

| | | |
|---|---|---|
| 1,609,826 | Kinzie | Dec. 7, 1926 |

FOREIGN PATENTS

| | | |
|---|---|---|
| 270,040 | Great Britain | May 5, 1927 |
| 315,675 | Great Britain | July 16, 1929 |
| 524,142 | Great Britain | July 31, 1940 |
| 610,549 | Great Britain | Oct. 18, 1948 |
| 653,993 | Great Britain | May 30, 1951 |

OTHER REFERENCES

Mellor: Comprehensive Treatise on Inorganic and Theoretical Chemistry, vol. 7, pages 102–103; Longmans, Green & Co., New York and London (1927).

Beyer, Spink, West and Wilhelm: "Caustic Treatment of Zircon Sand," AEC Pamphlet ISC–437 (Rev.), 15 pp., August 17, 1954.

Ishino et al.: "Extraction and Preparation of Zirconium Compounds From Zircon Ore by Wet Process," Technol. Repts. Osaka, Univ., 1, 119–32 (1951). See Chemical Abstracts, 45, 8419e (1951).